United States Patent
Kim

(10) Patent No.: US 8,386,831 B2
(45) Date of Patent: Feb. 26, 2013

(54) DCAS HEADEND SYSTEM AND METHOD FOR PROCESSING ERROR OF SECURE MICRO CLIENT SOFTWARE

(75) Inventor: Soon Choul Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 343 days.

(21) Appl. No.: 12/881,746

(22) Filed: Sep. 14, 2010

(65) Prior Publication Data

US 2011/0154098 A1 Jun. 23, 2011

(30) Foreign Application Priority Data

Dec. 21, 2009 (KR) .................. 10-2009-0128072

(51) Int. Cl.
*G06F 11/00* (2006.01)
(52) U.S. Cl. .................. 714/4.1; 726/30; 725/152
(58) Field of Classification Search .................. 714/4.1, 714/38.1–38.14, 48; 725/25, 31, 152; 726/1, 726/30
See application file for complete search history.

(56) References Cited

U.S. PATENT DOCUMENTS

| 2008/0177998 A1 | 7/2008 | Apsangi et al. | |
| 2008/0201748 A1* | 8/2008 | Hasek et al. | 725/98 |
| 2009/0158401 A1* | 6/2009 | Kim et al. | 726/4 |
| 2011/0125995 A1* | 5/2011 | Choi et al. | 713/2 |
| 2011/0213976 A1* | 9/2011 | Ryou et al. | 713/169 |

FOREIGN PATENT DOCUMENTS

| KR | 10-0718452 | 5/2007 |
| KR | 10-0737115 | 7/2007 |

* cited by examiner

*Primary Examiner* — Bryce Bonzo
(74) *Attorney, Agent, or Firm* — Nelson Mullins Riley & Scarborough LLP; EuiHoon Lee, Esq.

(57) ABSTRACT

A Downloadable Conditional Access System (DCAS) headend system and method for processing an error of Secure Micro (SM) Client Software are provided to prevent further transmission of SM Client Software where an error occurred, and to prevent unnecessary traffic due to repeat reinstallation of SM Client Software between an Authentication Proxy (AP) server and a terminal, by changing policy information regarding a transmission of SM Client Software associated with error information, when a number of terminals that transmit the error information exceeds a reference value as a result of analyzing result information regarding a reception and an installation of the SM Client Software received from a terminal corresponding to a DCAS headend system.

20 Claims, 9 Drawing Sheets

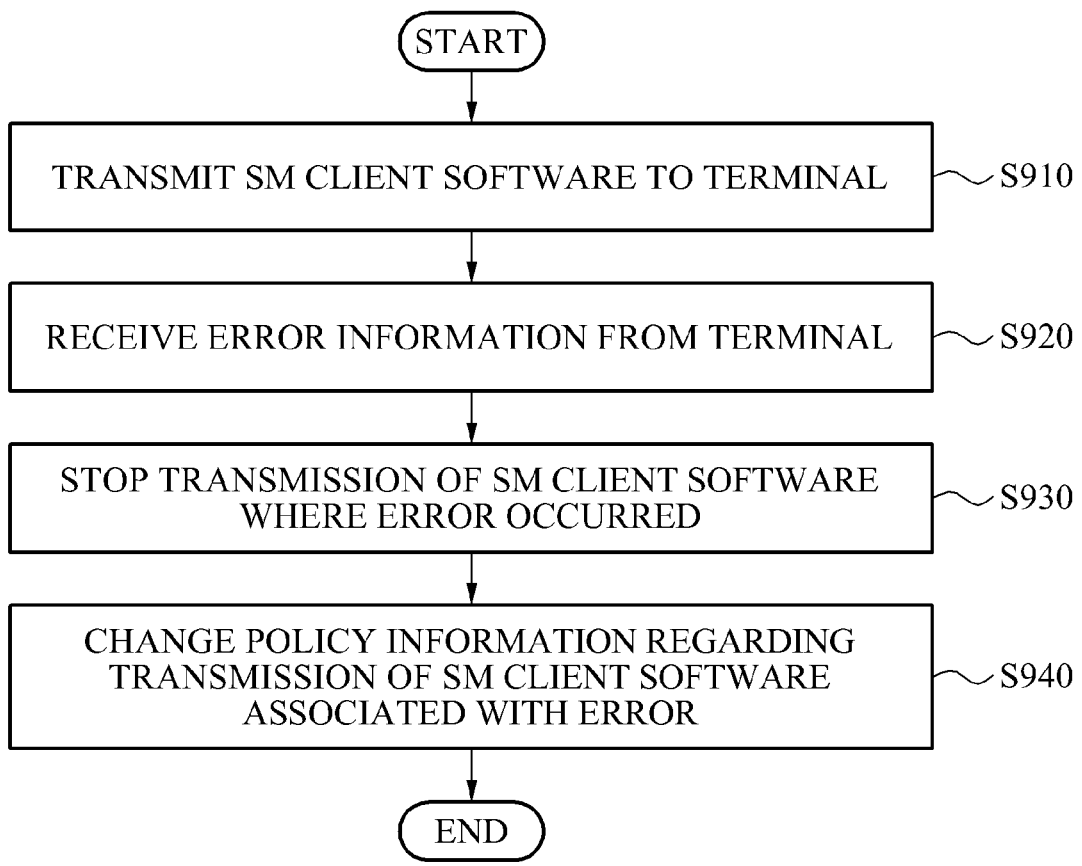

DCAS HEADEND SYSTEM AND METHOD FOR PROCESSING ERROR OF SECURE MICRO CLIENT SOFTWARE

CROSS-REFERENCE TO RELATED APPLICATION

This application claims the benefit of Korean Patent Application No. 10-2009-0128072, filed on Dec. 21, 2009, in the Korean Intellectual Property Office, the disclosure of which is incorporated herein by reference.

BACKGROUND

1. Field of the Invention

Embodiments of the present invention relate to a Downloadable Conditional Access System (DCAS) headend system, and more particularly, to a DCAS headend system that may process an error of Secure Micro (SM) Client Software, and a method of removing an error of a DCAS headend system.

2. Description of the Related Art

A Downloadable Conditional Access System (DCAS) has started to appear in a cable broadcasting field. In a cable broadcasting field that provides pay broadcast contents as a main business model, an established open cable standard defines that a conditional access module is separated from a receiver of a subscriber so that an exclusive supplier of a receiver company may be prevented from emerging, and so that a cable broadcast service may be provided regardless of a service provider and a service area.

In accordance with the established open cable standard, the conditional access module independent of the receiver may be standardized as a cable card in a Personal Computer Memory Card International Association (PCMCIA) card type, and a cable service provider may provide subscribers with only cable cards, instead of receivers, so that pay broadcast services may be provided. The open cable standard was expected to enable consumers to select among a greater number of receivers, and expected to reduce costs related to a conditional access system of a cable service provider. However, it was difficult to obtain the expected results in an actual service operation, due to an increase in prices and managing costs of cable cards, and disinterest in a receiver retail market.

Accordingly, a DCAS technology has been developed by which a cable service provider enables conditional access software to be downloaded in a receiver of a subscriber using a conventional cable network so that a pay broadcast service may be provided, without separately including a hardware-based conditional access module in a terminal of a subscriber.

A DCAS and a terminal perform mutual authentication and downloading of Secure Micro (SM) Client Software through a DCAS mutual authentication protocol operation. Accordingly, the terminal receives the SM Client Software running on an SM of the terminal from the DCAS headend system. The SM Client Software may include various versions based on hardware and software versions of the terminal, and may be subject to an actual test and validation and may be transmitted to the terminal.

However, an error may occur during a reception and an installation of SM Client Software due to an error of a manufacturer of the SM Client Software, an unexpected operation of a terminal, or an error of an operator of a DCAS headend system. When the error is not instantly processed, an excessive amount of bidirectional communication traffic may be induced, or loads may be excessively increased in the DCAS headend system due to excessive retransmission requests of a terminal.

SUMMARY

According to an aspect of the present invention, there is provided a Downloadable Conditional Access System (DCAS) headend system, including: an Authentication Proxy (AP) server to authenticate a terminal; a DCAS Provisioning Server (DPS) to store and process policy information regarding a transmission of a Secure Micro (SM) Client Software; and an Integrated Personalization System (IPS) server to store the SM Client Software, and to transmit the SM Client Software to the terminal when the terminal is authenticated by the AP server, wherein the AP server receives result information regarding a reception and an installation of the SM Client Software from the terminal, and transmits the result information to the DPS and the IPS server, and wherein the DPS changes policy information related to an error associated with the SM Client Software among the policy information, when the received result information contains error information regarding the error and when a number of terminals that transmit the error information exceeds a reference value.

According to another aspect of the present invention, there is provided a DCAS headend system, including: a transmitter to transmit SM Client Software to a terminal; a receiver to receive error information regarding an error from the terminal, when the error is associated with the SM Client Software; and a processor to change policy information regarding a transmission of the SM Client Software associated with the error, when a number of terminals that transmit the error information exceeds a reference value, wherein the transmitter stops the transmission of the SM Client Software associated with the error, when the number of terminals that transmit the error information exceeds the reference value.

According to another aspect of the present invention, there is provided a DPS of a DCAS headend system, the DPS including: a first database to store information regarding SM Client Software, the SM Client Software being transmitted to a terminal; a second database to receive result information regarding a reception and an installation of the SM Client Software from the terminal, and to store the received result information; a third database to store policy information regarding a transmission of the SM Client Software; a determiner; and a processor, wherein the second database extracts error information regarding an error associated with the SM Client Software from the result information, wherein the determiner receives the error information from the second database, and when a number of terminals that transmit the error information exceeds a reference value, extracts the information regarding the SM Client Software associated with the error information from the first database and transmits the extracted information to the processor, and wherein the processor changes policy information related to the error associated with the SM Client Software among the policy information stored in the third database, based on the information received from the determiner.

According to another aspect of the present invention, there is provided a method of removing an error in a DCAS headend system, the method including: transmitting SM Client Software to a terminal, when the terminal is authenticated by an AP server; receiving, by the AP server, result information regarding a reception and an installation of the SM Client Software from the terminal, and transmitting the result information to a DPS and an IPS server; and changing policy information regarding a transmission of the SM Client Software associated with an error, when the result information received by the DPS contains error information regarding the error and when a number of terminals that transmit the error information exceeds a reference value.

According to another aspect of the present invention, there is provided a method of removing an error in a DCAS headend system, the method including: transmitting SM Client Software to a terminal; receiving error information regarding an error from the terminal, when the error occurs in the SM Client Software; stopping a transmission of the SM Client Software where the error occurred, when a number of terminals that transmit the error information exceeds a reference value; and changing policy information regarding the transmission of the SM Client Software associated with the error.

EFFECT

According to embodiments of the present invention, it is possible to prevent further transmission of Secure Micro (SM) Client Software where an error occurred, by changing policy information regarding a transmission of SM Client Software associated with error information, when a number of terminals that transmit the error information exceeds a reference value as a result of analyzing result information regarding a reception and an installation of the SM Client Software received from a terminal corresponding to a DCAS headend system.

Additionally, according to embodiments of the present invention, it is possible to prevent unnecessary traffic due to repeat reinstallation of SM Client Software between an Authentication Proxy (AP) server and a terminal, by changing policy information regarding a transmission of SM Client Software associated with error information, when a number of terminals that transmit the error information exceeds a reference value as a result of analyzing result information regarding a reception and an installation of the SM Client Software received from a terminal corresponding to a DCAS headend system.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 9 is a flowchart illustrating a method of removing an error in a DCAS headend system according to another embodiment of the present invention.

DETAILED DESCRIPTION

Figure 1:
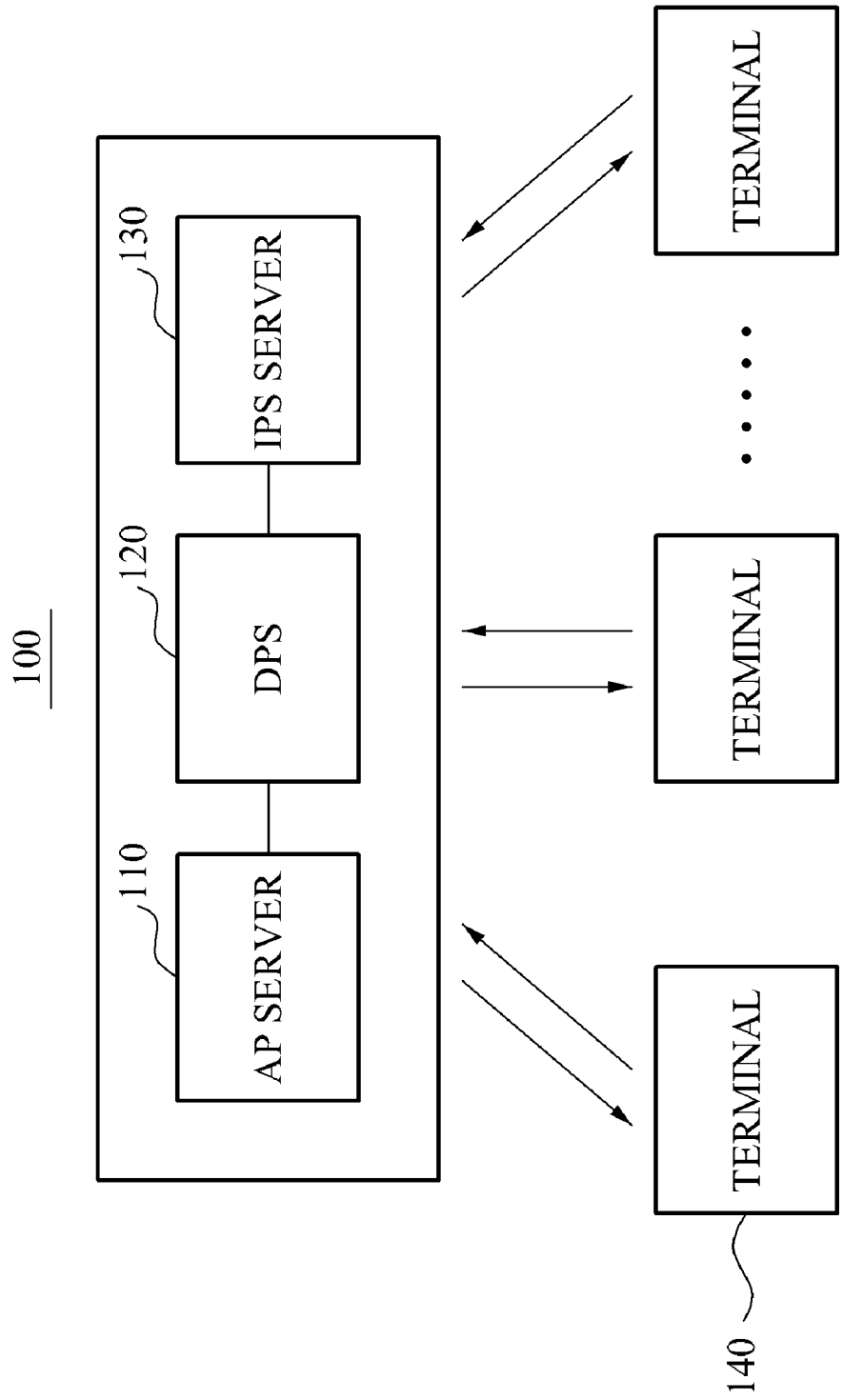
FIG. 1 is a diagram illustrating of a configuration of a Downloadable Conditional Access System (DCAS) headend system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating of a configuration of a Downloadable Conditional Access System (DCAS) headend system 100 according to an embodiment of the present invention.

Referring to FIG. 1, the DCAS headend system 100 includes an Authentication Proxy (AP) server 110, a DCAS Provisioning Server (DPS) 120, and an Integrated Personalization System (IPS) server 130.

The AP server 110 may authenticate at least one terminal 140 that corresponds to the DCAS headend system 100.

The DPS 120 may store and process policy information regarding a transmission of Secure Micro (SM) Client Software that is distributed by the DCAS headend system 100 to the terminal 140. The SM Client Software and the policy information will be further described with reference to FIGS. 2 and 3, respectively, below.

The IPS server 130 may store the SM Client Software. When the terminal 140 is authenticated by the AP server 110, the IPS server 130 may transmit the SM Client Software to the terminal 140.

The terminal 140 may receive the SM Client Software from the IPS server 130, and may install the received SM Client Software. Depending on embodiments, it may be impossible for the terminal 140 to receive the SM Client Software due to errors occurring in the SM Client Software, the DCAS headend system 100, a network, and the like, or an error may occur while the received SM Client Software is installed. Additionally, the terminal 140 may transmit, to the DCAS headend system 100, result information regarding whether an error occurs during a reception and an installation of the SM Client Software.

The AP server 110 may receive the result information from the terminal 140, and may transmit the received result information to the DPS 120 and the IPS server 130. The result information will be further described with reference to FIG. 4 below.

The DPS 120 may analyze the result information received from the AP server 110, and may determine whether the result information contains error information regarding an error associated with the SM Client Software. The error information will be further described with reference to FIG. 5 below.

Different types of terminals may correspond to a DCAS headend system, and different versions of SM Client Software may be used by each terminal. Accordingly, an occurrence or non-occurrence of an error during the reception and installation of the SM Client Software may be determined for each of the different types of terminals. Additionally, error information may be contained in all or a part of result information regarding the reception and installation of the SM Client Software. Here, the result information may be received from the different types of terminals.

When the result information received from the AP server 110 contains the error information, and when a number of terminals that transmit the error information exceeds a reference value, the DPS 120 may change policy information regarding a transmission of SM Client Software associated with the error information among the policy information.

The DPS 120 may set a reference value to determine whether an error occurs in the SM Client Software. Depending on embodiments, the DPS 120 may set the reference value based on at least one of a reception trial count per unit of time indicating a number of times that the terminal 140 attempts to receive the SM Client Software per unit of time, a reception failure count per unit of time indicating a number of times that the terminal 140 fails to receive the SM Client Software per unit of time, a total reception trial count indicating a total number of times that the terminal 140 attempts to receive the SM Client Software, a total reception failure count indicating a total number of times that the terminal 140 fails to receive the SM Client Software, a failure rate per unit of time indicating a percentage of the reception failure count per unit of time with respect to the reception trial count per unit of time, and an average failure rate indicating a percentage of the total reception failure count with respect to the total reception trial count.

When the number of terminals that transmit the error information exceeds the reference value, the DPS 120 may change the policy information regarding the transmission of the SM Client Software associated with the error indicated in the error information, to prevent the SM Client Software from being distributed to the terminal 640. Depending on embodiments, the DPS 120 may change the policy information so that the SM Client Software associated with the error indicated in the error information may be removed. Also, the DPS 120 may change the policy information so that the error that is contained in the error information and is associated with the SM Client Software may be corrected.

The DPS 120 may store the changed policy information. Additionally, the DPS 120 may transmit the changed policy information to the AP server 110 and the terminal 140.

Figure 2:
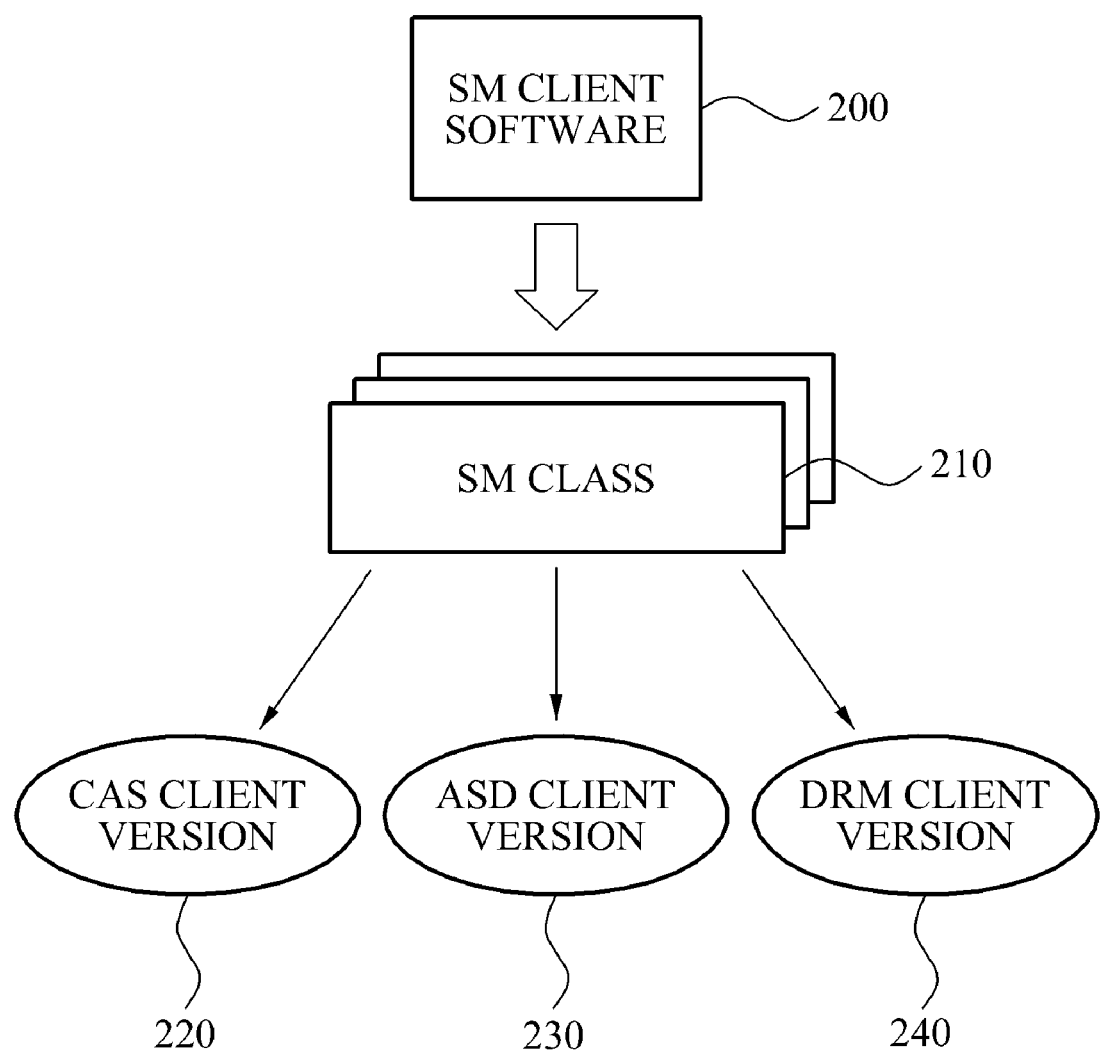
FIG. 2 is a diagram illustrating a configuration of Secure Micro (SM) Client Software according to an embodiment of the present invention.

FIG. 2 is a diagram illustrating a configuration of SM Client Software 200 according to an embodiment of the present invention.

Referring to FIG. 2, the SM Client Software 200 may be classified into at least one SM class 210, based on a type, and a hardware version of an SM contained in a terminal corresponding to a DCAS headend system. The at least one SM class 210 may be classified into a CAS client version 220, an ASD client version 230, and a Digital Rights Management (DRM) client version 240.

For example, the error information described with reference to FIG. 1 may include information indicating that an error occurred in a second CAS client version of a first SM class of the SM Client Software. In this example, the DPS 120 of FIG. 1 may change the policy information so that the second CAS client version of the first SM class may be removed from the SM Client Software, or so that an error associated with the second CAS client version of the first SM class in the SM Client Software may be corrected.

Figure 3:
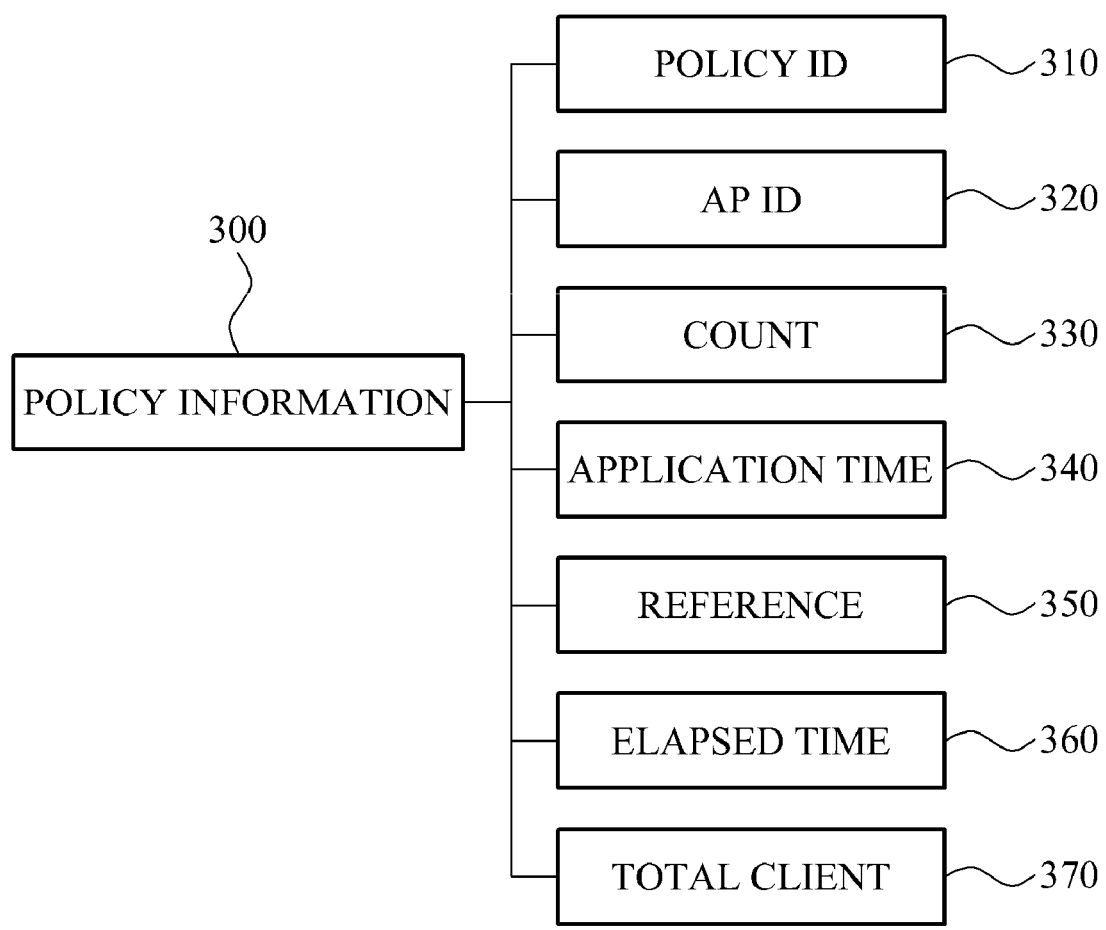
FIG. 3 is a block diagram illustrating policy information according to an embodiment of the present invention.

FIG. 3 is a block diagram illustrating policy information 300 according to an embodiment of the present invention.

Referring to FIG. 3, the policy information 300 may include at least one of a policy identifier (ID) 310 of the policy information 300, an AP ID 320 of an AP server, a count value 330 obtained by counting a number of times the policy information 300 is changed, an application time 340 during which the policy information 300 is applied to the AP server, a reference value 350, an elapsed time 360 after the policy information 300 is applied to the AP server, and a total client value 370 indicating a number of clients of the SM Client Software that are associated with the policy information 300.

The policy ID 310 may be used to identify a unique ID of the policy information 300 regarding a transmission of SM Client Software that is stored in a DPS of a DCAS headend system. Since the DPS of the DCAS headend system may change the policy information 300, and may also store a plurality of pieces of policy information 300, the policy information 300 may include the policy ID 310 to identify the plurality of pieces of policy information 300. Depending on embodiments, the policy information 300 may be determined for each version of an SM class into which the SM Client Software is classified, for example, based on the CAS client version, the ASD client version, and the DRM client version. Additionally, the policy ID 310 may be assigned to the policy information 300 determined for each version.

The AP ID 320 may be used to identify a unique ID of an AP server to which the policy information 300 is being applied.

The count value 330 may be obtained by counting a number of times that the policy information 300 is changed when a number of terminals that transmit error information contained in result information exceeds a reference value. For example, a terminal may receive the policy information 300 from a DCAS headend system, and may store the count number 330 contained in the received policy information 300. In this example, when the stored count value 330 differs from a count value contained in newly received policy information, the terminal may request the DCAS headend system to transmit SM Client Software associated with the newly received policy information, namely changed policy information.

The application time 340 may be a time during which the policy information 300 is applied to the AP server. Specifically, when the DPS of the DCAS headend system changes the policy information 300, the application time 340 may indicate a time during which the changed policy information 300 is applied to the AP server.

The reference value 350 may be used to determine whether there is an error associated with the SM Client Software. When a number of terminals that transmit error information contained in result information exceeds the reference value 350, the DPS of the DCAS headend system may change the policy information 300.

The elapsed time 360 may be a time elapsed after the policy information 300 is applied to the AP server. In other words, the elapsed time 360 may be defined as a time between the application time 340 and a current time.

The total client value 370 may be obtained by counting a number of SM Client Software associated with the policy information 300. The total client value 370 may be a number of SM Client Software contained in a single piece of policy information. Additionally, the total client value 370 may be a total number of SM Client Software contained in each of a plurality of pieces of policy information.

Figure 4:
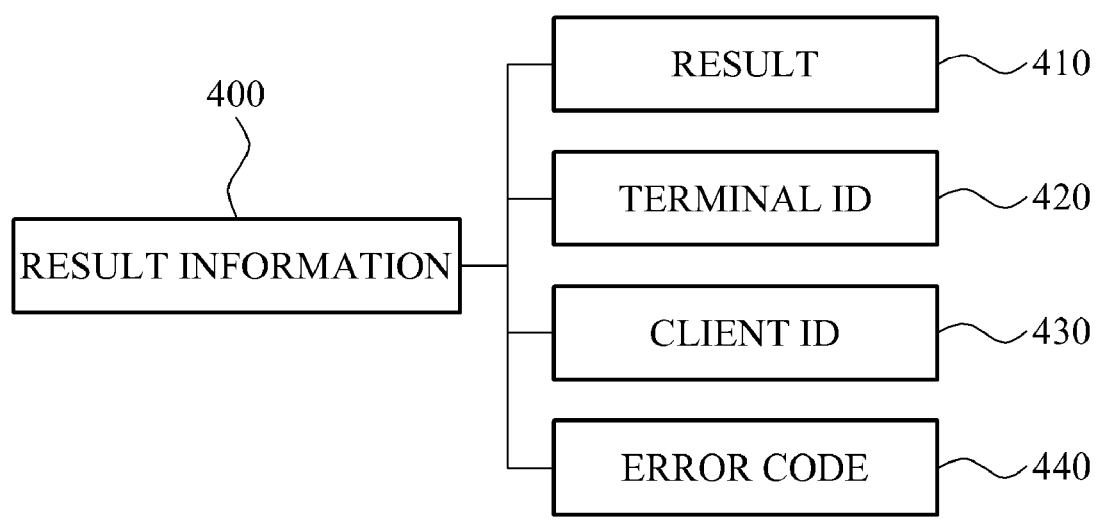
FIG. 4 is a diagram illustrating result information according to an embodiment of the present invention.

FIG. 4 is a diagram illustrating result information 400 according to an embodiment of the present invention.

Referring to FIG. 4, the result information 400 may include a result 410, a terminal ID 420, a client ID 430, and an error code 440.

The result 410 may be information indicating whether an error occurs while a terminal receives SM Client Software from a DCAS headend system and installs the SM Client Software. Depending on embodiments, the result 410 may be a boolean type, and may represent an occurrence or non-occurrence of the error during a reception and an installation of the SM Client Software, using "1" or "0," respectively.

The terminal ID 420 may be used to identify a unique ID of a terminal that transmits the result information 400. Depending on embodiments, the terminal ID 420 may be represented as a keypairing ID. Additionally, the terminal ID 420 may be a character (char) type, and may be a combination of an SM ID of 40 bytes and a TP ID of 8 bytes.

The client ID 430 may be used to identify a unique ID of SM Client Software transmitted to a terminal. Depending on embodiments, the client ID 430 may have an integer (int) type.

The error code 440 may be information regarding an error occurring while SM Client Software is received and installed, when the result 410 contains information, for example "0" indicating an occurrence of the error during reception and installation of the SM Client Software. Depending on embodiments, the error code 440 may be an octet type. The error code 440 may include a code indicating a fault in a network or a server, a code indicating a reception failure of the SM Client Software, a code indicating a verification failure of the SM Client Software, a code indicating an execution failure of the SM Client Software, and a code indicating that there is no response from the terminal.

The code indicating a fault in a network or a server may be used when the SM Client Software fails to be received and installed due to a fault occurring in a network used by a terminal to connect to a corresponding DCAS headend system, or in a server that stores the SM Client Software. Depending on embodiments, the SM Client Software may be stored in an IPS server of the DCAS headend system, or in a server that is independent of the DCAS headend system and is connected by the terminal to receive the SM Client Software.

The code indicating a reception failure of the SM Client Software may be used when SM Client Software is not found on a server that stores the SM Client Software even when a terminal connects to the server, or when the SM Client Software is prematurely terminated while the terminal receives the SM Client Software from the server.

The code indicating a verification failure of the SM Client Software may be used when the SM Client Software is invalid in an SM of the terminal due to an error in hash value verification, a decoding failure, a decompression failure, and the like, even when the terminal receives the SM Client Software.

The code indicating an execution failure of the SM Client Software may be used when an abnormal operation, such as an abnormal termination, may be performed during execution of the SM Client Software, even when the terminal completes verification of the SM Client Software.

The code indicating that there is no response from the terminal may be used when the terminal that receives the SM Client Software does not transmit the result information 400 to the DCAS headend system.

Figure 5:
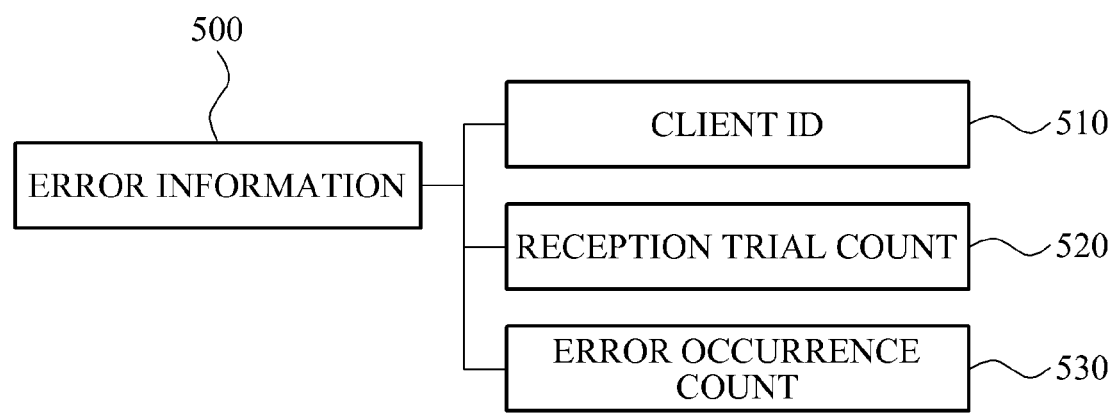
FIG. 5 is a diagram illustrating error information according to an embodiment of the present invention.

FIG. 5 is a diagram illustrating error information 500 according to an embodiment of the present invention.

Referring to FIG. 5, the error information 500 may include a client ID 510, a reception trial count 520, and an error occurrence count 530.

The client ID 510 may be used to identify a unique ID of SM Client Software associated with an error indicated in the error information 500.

The reception trial count 520 may indicate a number of times that a terminal attempts to receive the SM Client Software.

The error occurrence count 530 may indicate a number of times that an error occurs while the terminal receives and installs the SM Client Software.

Figure 6:
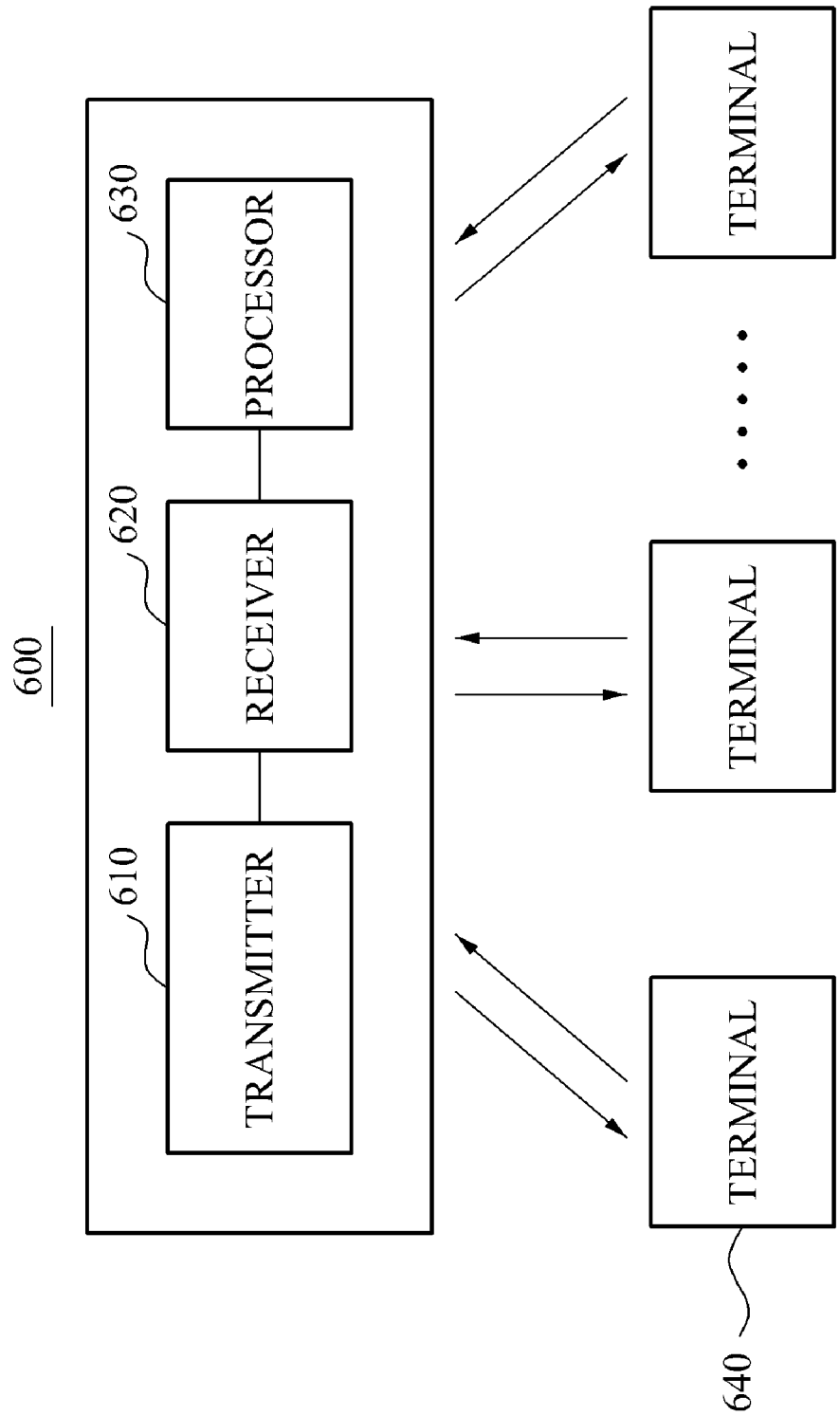
FIG. 6 is a diagram illustrating a configuration of a DCAS headend system according to another embodiment of the present invention.

FIG. 6 is a diagram illustrating a configuration of a DCAS headend system 600 according to another embodiment of the present invention.

Referring to FIG. 6, the DCAS headend system 600 may include a transmitter 610, a receiver 620, and a processor 630.

The transmitter 610 may transmit SM Client Software to at least one terminal 640 that corresponds to the DCAS headend system 600. The SM Client Software described above with reference to FIG. 2 may equally be applied to the SM Client Software transmitted by the transmitter 610 to the terminal 640, and accordingly, a further description thereof will be omitted herein.

The terminal 640 may receive the SM Client Software from the transmitter 610 of the DCAS headend system 600, and may install the received SM Client Software. Depending on embodiments, it may be impossible for the terminal 640 to receive the SM Client Software due to errors occurring in the SM Client Software, the DCAS headend system 600, a network, and the like, or an error may occur while the received SM Client Software is installed. Additionally, the terminal 640 may transmit, to the DCAS headend system 600, result information regarding whether an error occurs during a reception and an installation of the SM Client Software.

Depending on embodiments, the terminal 640 may transmit the result information to the DCAS headend system 600. The result information 400 described above with reference to FIG. 4 may equally be applied to the result information transmitted by the terminal 640 to the DCAS headend system 600, and accordingly, a further description thereof will be omitted herein.

When there is an error associated with the SM Client Software transmitted to the terminal 640, the receiver 620 may receive error information regarding the error from the terminal 640. The error information 500 described above with reference to FIG. 5 may equally be applied to the error information received from the terminal 640 by the receiver 620, and accordingly, a further description thereof will be omitted herein.

When a number of terminals 640 that transmit the error information to the receiver 620 exceeds a reference value, the processor 630 may change policy information regarding a transmission of the SM Client Software associated with the error indicated in the error information. Here, the transmitter 610 may stop the transmission of the SM Client Software associated with the error indicated in the error information. The policy information 300 described above with reference to FIG. 3 may equally be applied to the policy information changed by the processor 630, and accordingly, a further description thereof will be omitted herein.

Additionally, the processor 630 may set a reference value used to determine whether there is an error associated with SM Client Software. Depending on embodiments, the processor 630 may set the reference value based on at least one of a reception trial count per unit of time indicating a number of times that the terminal 640 attempts to receive the SM Client Software per unit of time, a reception failure count per unit of time indicating a number of times that the terminal 640 fails to receive the SM Client Software per unit of time, a total reception trial count indicating a total number of times that the terminal 640 attempts to receive the SM Client Software, a total reception failure count indicating a total number of times that the terminal 640 fails to receive the SM Client Software, a failure rate per unit of time indicating a percentage of the reception failure count per unit of time with respect to the reception trial count per unit of time, and an average failure rate indicating a percentage of the total reception failure count with respect to the total reception trial count.

When the number of terminals 640 that transmit the error information exceeds the reference value, the processor 630 may change the policy information regarding the transmission of the SM Client Software associated with the error indicated in the error information, to prevent the SM Client Software from being distributed to the terminal 640. Depending on embodiments, the processor 630 may change the policy information, so that the SM Client Software associated with the error indicated in the error information may be removed. Also, the processor 630 may change the policy information, so that the error that is contained in the error information and is associated with the SM Client Software may be corrected.

According to an aspect of the present invention, the DCAS headend system 600 may further include a storage unit (not shown). The storage unit may store at least one of SM Client Software and policy information. Depending on embodiments, a storage unit separated from the DCAS headend system 600 may store SM Client Software, and the terminal 640 may receive the SM Client Software from the storage unit.

Figure 7:
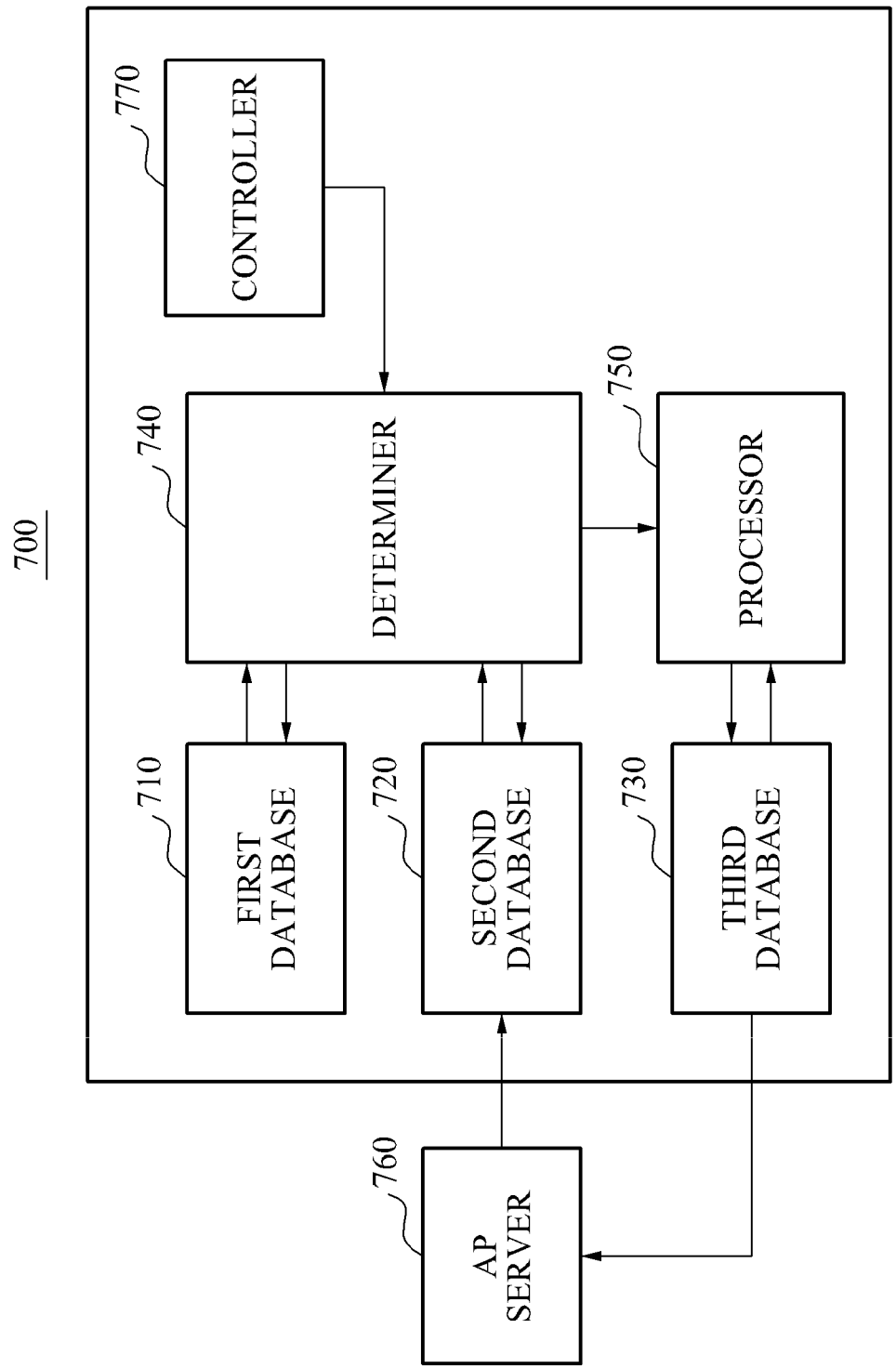
FIG. 7 is a block diagram illustrating a configuration of a DCAS Provisioning Server (DPS) in a DCAS headend system according to an embodiment of the present invention.

FIG. 7 is a block diagram illustrating a configuration of a DPS 700 in a DCAS headend system according to an embodiment of the present invention.

Referring to FIG. 7, the DPS 700 may include a first database 710, a second database 720, a third database 730, a determiner 740, and a processor 750.

The first database 710 may store information regarding SM Client Software that is transmitted to a terminal. Depending on embodiments, the information regarding the SM Client Software may include an ID of the SM Client Software, an SM class of the SM Client Software, a client version of the SM Client Software, and a time at which the SM Client Software is transmitted to the terminal.

The second database 720 may receive, from the terminal, result information regarding a reception and an installation of the SM Client Software, and may store the received result information. Additionally, the second database 720 may extract error information regarding an error associated with the SM Client Software from the result information received from the terminal. Depending on embodiments, the second database 720 may receive the result information from an AP server 760 included in the DCAS headend system.

According to an aspect of the present invention, error information may include a client ID, a reception trial count, and an error occurrence count. Specifically, the client ID may be used to identify a unique ID of SM Client Software associated with an error indicated in the error information. The reception trial count may indicate a number of times that a terminal attempts to receive the SM Client Software, and the error occurrence count may indicate a number of times that an error occurs while the terminal receives and installs the SM Client Software.

The third database 730 may store policy information regarding a transmission of the SM Client Software.

The determiner 740 may receive the error information from the second database 720. When a number of terminals that transmit the error information exceeds a reference value, the determiner 740 may extract the information regarding the SM Client Software associated with the error indicated in the error information from the first database 710, and may transmit the extracted information to the processor 750.

The determiner 740 may set the reference value based on at least one of a reception trial count per unit of time indicating a number of times that the terminal attempts to receive the SM Client Software per unit of time, a reception failure count per unit of time indicating a number of times that the terminal fails to receive the SM Client Software per unit of time, a total reception trial count indicating a total number of times that the terminal attempts to receive the SM Client Software, a total reception failure count indicating a total number of times that the terminal fails to receive the SM Client Software, a failure rate per unit of time indicating a percentage of the reception failure count per unit of time with respect to the reception trial count per unit of time, and an average failure rate indicating a percentage of the total reception failure count with respect to the total reception trial count.

According to an aspect of the present invention, the DPS 700 may further include a controller 770. The controller 770 may control a time at which the determiner 740 receives the error information from the second database 720. Specifically, the controller 770 may control the time at which the determiner 740 receives the error information from the second database 720, and the DPS 700 may periodically analyze whether an error occurs while the terminal receives and installs the SM Client Software.

The processor 750 may change the policy information regarding the transmission of the SM Client Software associated with the error indicated in the error information received by the determiner 740, based on the information regarding the SM Client Software associated with the error indicated in the error information. Depending on embodiments, the processor 750 may change the policy information so that the SM Client Software associated with the error indicated in the error information may be removed. The processor 750 may also change the policy information so that the error that is contained in the error information and is associated with the SM Client Software may be corrected. Additionally, the processor 750 may transmit the changed policy information to the third database 730. The third database 730 may store the changed policy information, and may transmit the changed policy information to the AP server 760. When the changed policy information is received, the AP server 760 may transmit the changed policy information to a terminal that corresponds to the DCAS headend system.

Figure 8:
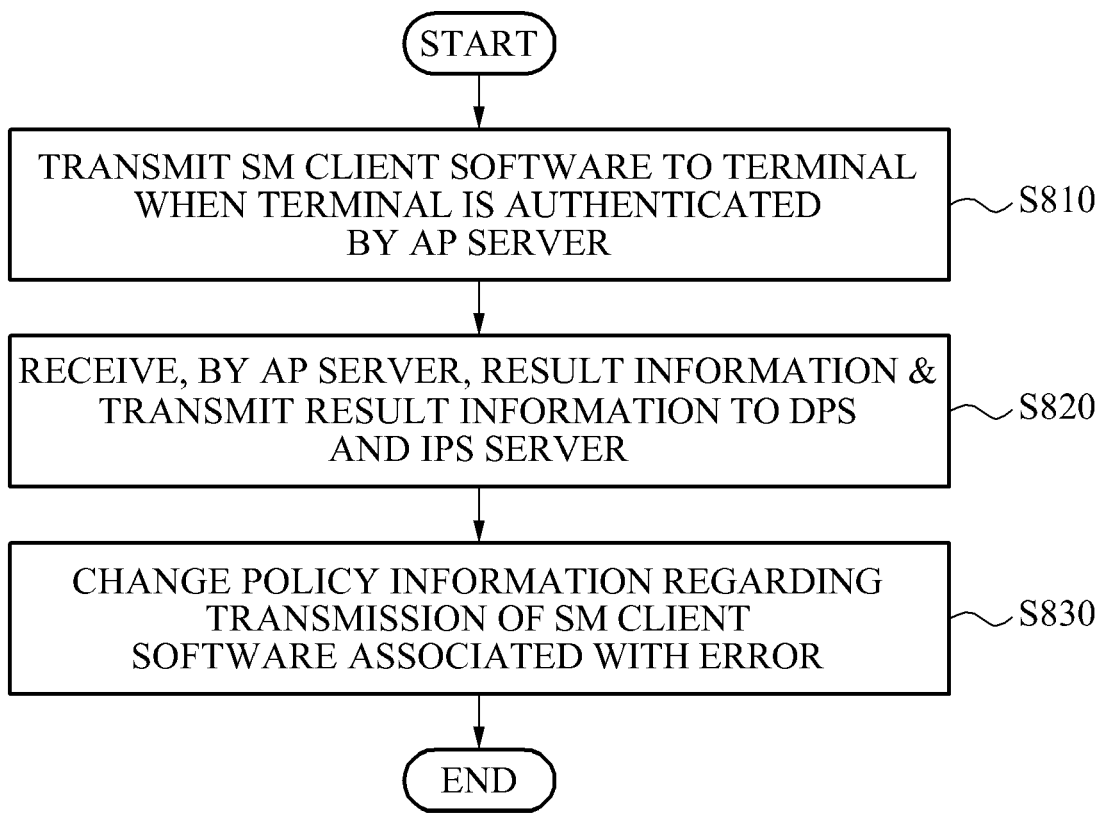
FIG. 8 is a flowchart illustrating a method of removing an error in a DCAS headend system according to an embodiment of the present invention.

FIG. 8 is a flowchart illustrating a method of removing an error in a DCAS headend system according to an embodiment of the present invention.

Referring to FIG. 8, when a terminal corresponding to the DCAS headend system is authenticated by an AP server in the DCAS headend system, SM Client Software may be transmitted to the terminal in operation S810.

The AP server may receive result information regarding a reception and an installation of the SM Client Software from the terminal, and may transmit the received result information to a DPS and an IPS server in operation S820.

When the result information contains error information regarding an error associated with the SM Client Software, and when a number of terminals that transmit the error information exceeds a reference value, the DPS may change policy information regarding a transmission of the SM Client Software associated with the error indicated in the error information in operation S830. Depending on embodiments, the policy information may be changed so that the SM Client Software associated with the error indicated in the error information may be removed, or so that the error may be corrected.

FIG. 9 is a flowchart illustrating a method of removing an error in a DCAS headend system according to another embodiment of the present invention.

Referring to FIG. 9, SM Client Software may be transmitted to a terminal in operation S910.

When an error occurs in the SM Client Software, error information regarding the error may be received from the terminal in operation S920.

When a number of terminals that transmit the error information exceeds a reference value, a transmission of the SM Client Software where the error occurred may be stopped in operation S930.

Subsequently, policy information regarding the transmission of the SM Client Software associated with the error may be changed in operation S940. Depending on embodiments, the policy information may be changed so that the SM Client Software associated with the error may be removed, or so that the error may be corrected.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A Downloadable Conditional Access System (DCAS) headend system, comprising:
    an Authentication Proxy (AP) server to authenticate a terminal;
    a DCAS Provisioning Server (DPS) to store and process policy information regarding a transmission of a Secure Micro (SM) Client Software; and
    an Integrated Personalization System (IPS) server to store the SM Client Software, and to transmit the SM Client Software to the terminal when the terminal is authenticated by the AP server,
    wherein the AP server receives result information regarding a reception and an installation of the SM Client Software from the terminal, and transmits the result information to the DPS and the IPS server, and
    wherein the DPS changes policy information related to an error associated with the SM Client Software among the policy information, when the received result information contains error information regarding the error and when a number of terminals that transmit the error information exceeds a reference value.

2. The DCAS headend system of claim 1, wherein the DPS changes the policy information so that the SM Client Software associated with the error is removed, or so that the error is corrected.

3. The DCAS headend system of claim 1, wherein the policy information comprises at least one of a policy identifier (ID) of the policy information, an AP ID of the AP server, a value being a number of times the policy information is changed, an application time during which the policy information is applied to the AP server, the reference value, an elapsed time after the policy information is applied to the AP server, and a value being a number of clients of the SM Client Software, the clients being associated with the policy information.

4. The DCAS headend system of claim 1, wherein the result information comprises at least one of:
    a result value indicating whether the terminal receives and installs the SM Client Software without the error;
    an ID of the terminal;
    an ID of the SM Client Software; and
    an error code indicating a type of the error when the error occurs.

5. The DCAS headend system of claim 4, wherein the error code comprises at least one of:
    a code indicating a fault in a network or a server;
    a code indicating a reception failure of the SM Client Software;
    a code indicating a verification failure of the SM Client Software;
    a code indicating an execution failure of the SM Client Software; and
    a code indicating that there is no response from the terminal.

6. The DCAS headend system of claim 1, wherein the error information comprises at least one of:
    a client ID of a client of the SM Client Software;
    a reception trial count indicating a number of times that the terminal attempts to receive the SM Client Software; and
    an error occurrence count indicating a number of times that an error occurs.

7. The DCAS headend system of claim 1, wherein the SM Client Software is classified into at least one SM class corresponding to an SM contained in the terminal, and
    wherein the at least one SM class is classified into a CAS client version, an ASD client version, and a Digital Rights Management (DRM) client version.

8. The DCAS headend system of claim 1, wherein the DPS sets the reference value based on at least one of:
    a reception trial count per unit of time indicating a number of times that the terminal attempts to receive the SM Client Software per unit of time;
    a reception failure count per unit of time indicating a number of times that the terminal fails to receive the SM Client Software per unit of time;
    a total reception trial count indicating a total number of times that the terminal attempts to receive the SM Client Software;
    a total reception failure count indicating a total number of times that the terminal fails to receive the SM Client Software;
    a failure rate per unit of time indicating a percentage of the reception failure count per unit of time with respect to the reception trial count per unit of time; and
    an average failure rate indicating a percentage of the total reception failure count with respect to the total reception trial count.

9. A DCAS headend system, comprising:
a transmitter to transmit SM Client Software to a terminal;
a receiver to receive error information regarding an error from the terminal, when the error is associated with the SM Client Software; and
a processor to change policy information regarding a transmission of the SM Client Software associated with the error, when a number of terminals that transmit the error information exceeds a reference value,
wherein the transmitter stops the transmission of the SM Client Software associated with the error, when the number of terminals that transmit the error information exceeds the reference value.

10. The DCAS headend system of claim 9, wherein the processor changes the policy information so that the SM Client Software associated with the error is removed, or so that the error is corrected.

11. The DCAS headend system of claim 9, further comprising:
a storage unit to store at least one of the SM Client Software and the policy information.

12. The DCAS headend system of claim 9, wherein the SM Client Software is classified into at least one SM class corresponding to an SM contained in the terminal, and
wherein the at least one SM class is classified into a CAS client version, an ASD client version, and a DRM client version.

13. A DPS of a DCAS headend system, the DPS comprising:
a first database to store information regarding SM Client Software, the SM Client Software being transmitted to a terminal;
a second database to receive result information regarding a reception and an installation of the SM Client Software from the terminal, and to store the received result information;
a third database to store policy information regarding a transmission of the SM Client Software;
a determiner; and
a processor,
wherein the second database extracts error information regarding an error associated with the SM Client Software from the result information,
wherein the determiner receives the error information from the second database, and when a number of terminals that transmit the error information exceeds a reference value, extracts the information regarding the SM Client Software associated with the error information from the first database and transmits the extracted information to the processor, and
wherein the processor changes policy information related to the error associated with the SM Client Software among the policy information stored in the third database, based on the information received from the determiner.

14. The DPS of claim 13, the DPS changing the policy information so that the SM Client Software associated with the error is removed, or so that the error is corrected.

15. The DPS of claim 13, wherein the determiner sets the reference value based on at least one of:
a reception trial count per unit of time indicating a number of times that the terminal attempts to receive the SM Client Software per unit of time;
a reception failure count per unit of time indicating a number of times that the terminal fails to receive the SM Client Software per unit of time;
a total reception trial count indicating a total number of times that the terminal attempts to receive the SM Client Software;
a total reception failure count indicating a total number of times that the terminal fails to receive the SM Client Software;
a failure rate per unit of time indicating a percentage of the reception failure count per unit of time with respect to the reception trial count per unit of time; and
an average failure rate indicating a percentage of the total reception failure count with respect to the total reception trial count.

16. The DPS of claim 13, further comprising:
a controller to control a time at which the determiner receives the error information from the second database.

17. A method of removing an error in a DCAS headend system, the method comprising:
transmitting SM Client Software to a terminal, when the terminal is authenticated by an AP server;
receiving, by the AP server, result information regarding a reception and an installation of the SM Client Software from the terminal, and transmitting the result information to a DPS and an IPS server; and
changing policy information regarding a transmission of the SM Client Software associated with an error, when the result information received by the DPS contains error information regarding the error and when a number of terminals that transmit the error information exceeds a reference value.

18. The method of claim 17, wherein the changing of the policy information comprises changing the policy information so that the SM Client Software associated with the error is removed, or so that the error is corrected.

19. A method of removing an error in a DCAS headend system, the method comprising:
transmitting SM Client Software to a terminal;
receiving error information regarding an error from the terminal, when the error occurs in the SM Client Software;
stopping a transmission of the SM Client Software where the error occurred, when a number of terminals that transmit the error information exceeds a reference value; and
changing policy information regarding the transmission of the SM Client Software associated with the error.

20. The method of claim 19, wherein the changing of the policy information comprises changing the policy information so that the SM Client Software associated with the error is removed, or so that the error is corrected.

* * * * *